(12) United States Patent
Fan

(10) Patent No.: US 9,736,449 B1
(45) Date of Patent: Aug. 15, 2017

(54) CONVERSION OF 2D IMAGE TO 3D VIDEO

(71) Applicant: Google Inc., Mountain View, CA (US)

(72) Inventor: Zihong Fan, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 664 days.

(21) Appl. No.: 13/965,059

(22) Filed: Aug. 12, 2013

(51) Int. Cl.
*H04N 15/00* (2006.01)
*H04N 13/00* (2006.01)

(52) U.S. Cl.
CPC ............................. *H04N 13/0022* (2013.01)

(58) Field of Classification Search
None
See application file for complete search history.

(56) References Cited

U.S. PATENT DOCUMENTS

| | | | | |
|---|---|---|---|---|
| 2005/0104878 A1* | 5/2005 | Kaye | ....................... | G06T 5/005 345/419 |
| 2007/0024614 A1* | 2/2007 | Tam | ....................... | G06T 7/0067 345/419 |
| 2008/0247670 A1* | 10/2008 | Tam | ....................... | G06T 7/0051 382/298 |
| 2011/0142309 A1* | 6/2011 | Zhang | ................ | H04N 13/0022 382/128 |
| 2012/0013711 A1* | 1/2012 | Tamir | ................... | H04N 13/026 348/46 |

OTHER PUBLICATIONS

"Stereoscopic Image Generation Based on Depth Images for 3D TV", Liang Zhang; Tam, W. J., IEEE Transactions on Broadcasting, vol. 51, Issue 2, Jun. 2005 pp. 191-199.*
Bourge, et al., "MPEG-C Part 3: Enabling the Introduction of Video Plus Depth Contents", Proceedings of the 3D Workshop on Content Generation and Coding for 3DTV, Jun. 2006, pp. 1-4.

* cited by examiner

*Primary Examiner* — Dakshesh Parikh
(74) *Attorney, Agent, or Firm* — Lowenstein Sandler LLP

(57) ABSTRACT

A 3D video generator receives a two-dimensional image to be converted to a first three-dimensional video. The 3D video generator generates a depth map based on depth values for each of a plurality of pixels in the input image. Based on the depth map, the input image and a view disparity value, the 3D video generator creates a series of modified images that are associated with the input image. When combined, the series of modified images comprises a 3D video.

19 Claims, 10 Drawing Sheets

CONVERSION OF 2D IMAGE TO 3D VIDEO

TECHNICAL FIELD

This disclosure relates to the field of image processing and, in particular, to conversion of a 2D image to 3D video.

BACKGROUND

Advances in display technology have caused display devices capable of conveying a stereoscopic perception of three-dimensional (3D) depth to a view to become increasingly common. These 3D displays may be found in high-definition (HD) television sets, gaming devices, and other computing devices. The growing number of 3D displays has led to a need for additional 3D visual content (e.g., images, video). Conventionally, creating 3D content has been a difficult and time consuming process. This typically includes a lengthy, highly technical and expensive manual process. Conversion of two-dimensional (2D) images to 3D video has been performed; however, conventional conversion techniques use at least two images of the same subject, from different viewpoints, to create each frame in the resulting 3D video. In addition, conventional techniques are limited to converting specific types of images and may not be used for general 2D to 3D conversion tasks.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one implementation, a 3D video generator receives a two-dimensional input image to be converted to a first three-dimensional video. The video generator determines a depth value for each of a plurality of pixels in the original image and generates a depth map based on the depth values. The video generator can generate a modified image based on the input image, the depth map, and a view disparity. The original input image in combination with the modified image can form a sequence of frames in the three-dimensional video.

In one implementation, a depth value is determined for each of a plurality of pixels in an image by identifying a color value for each pixel, and identifying an estimated depth value that is associated with the color value. The color values may be defined, for example, using the Y-Cb-Cr color scheme or some other color scheme. The depth values for each pixel can be combined together to form a depth map. The modified image can be created by filtering the depth map, calculating a pixel shift for pixels in a modified image based on the depth values and the view disparity, and removing or filling in voids in the resulting modified image. At least one of a smoothing filter or a sharpening filter can be used to refine the depth map. Calculating a pixel shift for each of a plurality of pixels can be done by applying depth values and the view disparity to a view rendering algorithm. The output of the view rendering algorithm may define a pixel shift value for each pixel in the input image. In the modified image, pixels may be removed that are hidden from view due to the change in view disparity or added if they are visible.

BRIEF DESCRIPTION OF THE DRAWINGS

The present disclosure is illustrated by way of example, and not by way of limitation, in the figures of the accompanying drawings.

DETAILED DESCRIPTION

Implementations are described for generation of a 3D video from a single 2D image. In one implementation, a video generator can receive a two-dimensional input image. The input image may be a stand-alone image or may be one frame of video, for example. 3D video is generally made up of individual frames of the same subject, with a varying view disparity. The view disparity may represent the change in distance between separate viewpoints while looking at the same subject. By varying the view disparity between individual frames in a video, and viewing those frames in succession, a 3D video can be created.

In one implementation, the video generator can generate a 3D video from a 2D input image by determining depth values for each pixel in the input image, generating a depth map for the image, and using the input image, depth map, and view disparity values to create one or more modified images related to the input image. The modified images, together with the original, can form a sequence of frames in the 3D video output. The process may be repeated to generate additional frames for a longer video. The video generator can use rendering techniques in connection with the depth map to generate the three-dimensional output video, which may be stored or displayed for viewing by a user.

Implementations of the conversion techniques described herein allow for fully automatic conversion of 2D visual content to 3D. This can allow an individual to avoid the costly and time-intensive processes of capturing a 3D image or manually converting multiple existing 2D images to 3D video. The use of a depth map and simulated change in view disparity allows for the generation of 3D video based on a single 2D image, instead of relying on two or more images of the same subject with different view disparities.

Figure 1:
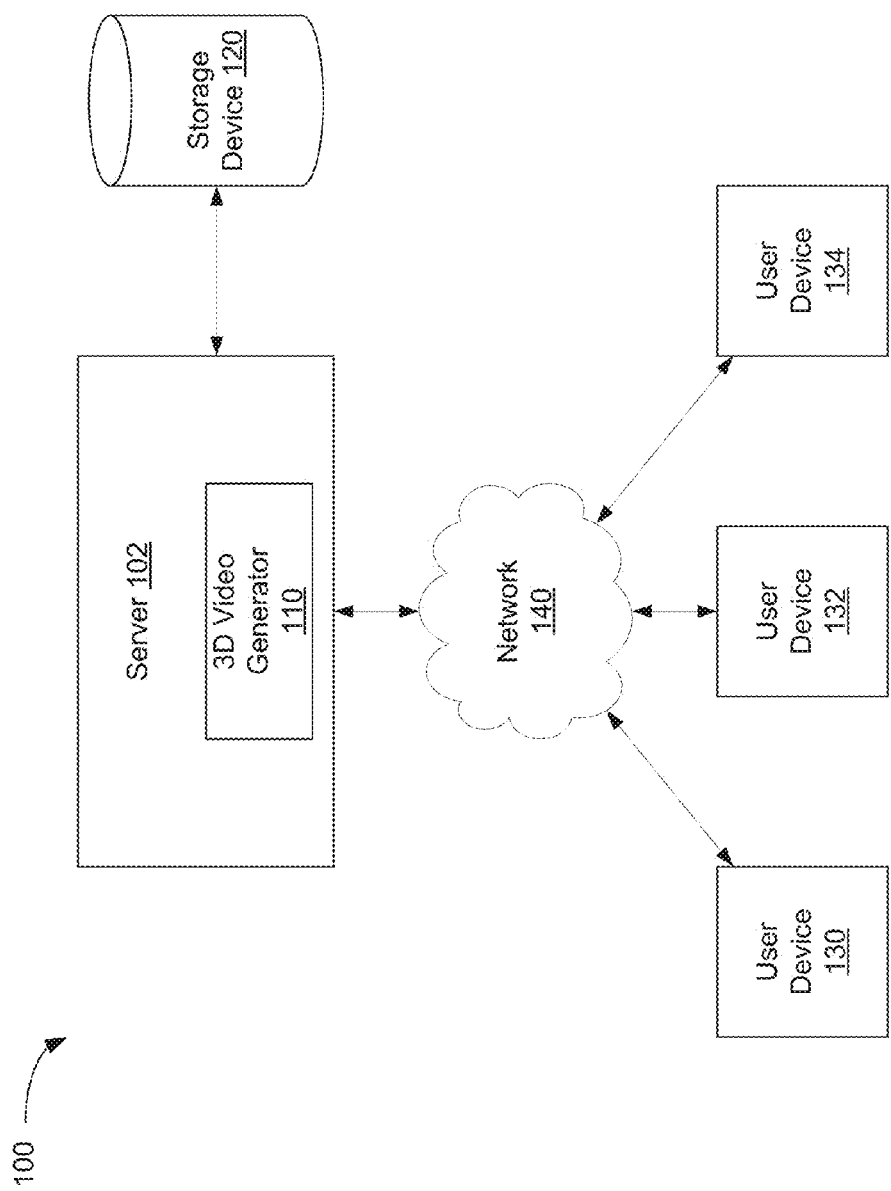
FIG. 1 is a block diagram illustrating an exemplary network architecture in which implementations of the present disclosure may be implemented.

FIG. 1 is a block diagram illustrating an exemplary network architecture in which implementations of the present disclosure may be implemented. The network architecture 100 may include one or more servers 102 communicating with one or more user devices 130, 132, 134 over one or more networks 140, according to one implementation. Network 140 can be a local area network (LAN), a wireless network, a telephone network, a mobile communications network, a wide area network (WAN), such as the Internet, or similar communication system. User devices 130, 132, 134 may be any type of computing device including server computers, gateway computers, desktop computers, laptop computers, mobile communications devices, cell phones, smart phones, hand-held computers, tablets, or similar computing devices. The user devices 130, 132, 134 may be variously configured with different features to enable viewing of visual content, such as images, videos, etc.

Server 102 may include a network-accessible server-based functionality, various data stores, and/or other data processing equipment. The server 102 may be implemented by a single machine or a cluster of machines. Server 102 may include, for example, computer system 1000 of FIG. 10. In one implementation, server 102 includes 3D video generator 110. 3D video generator 110 can receive a two-dimensional input image (e.g., from a user or a computer application program) that is to be converted to a three-dimensional output video. Using the input image, a depth map, and a simulated view disparity, 3D video generator 110 can automatically generate the three-dimensional output video, as will be described below.

In one implementation, storage device 120 includes an image data store including a number of input 2D images as well as modified output images that form the 3D video. In response to a request from a user (e.g., received through one of user devices 130, 132, 134), 3D video generator 110 can convert one of the 2D images to 3D video. In another implementation, a user may provide a 2D image to be converted that was not previously stored in storage device 120.

In one implementation server 102 may include 3D video generator 110 and storage device 120. In another implementation, storage device 120 may be external to server 102 and may be connected to server 102 over a network or other connection. In other implementations, server 102 may include different and/or additional components which are not shown here so as not to obscure the present disclosure. Storage device 120 may include one or more mass storage devices which can include, for example, flash memory, magnetic or optical disks, or tape drives, read-only memory (ROM); random-access memory (RAM); erasable programmable memory (e.g., EPROM and EEPROM); flash memory; or any other type of storage medium.

Figure 2:
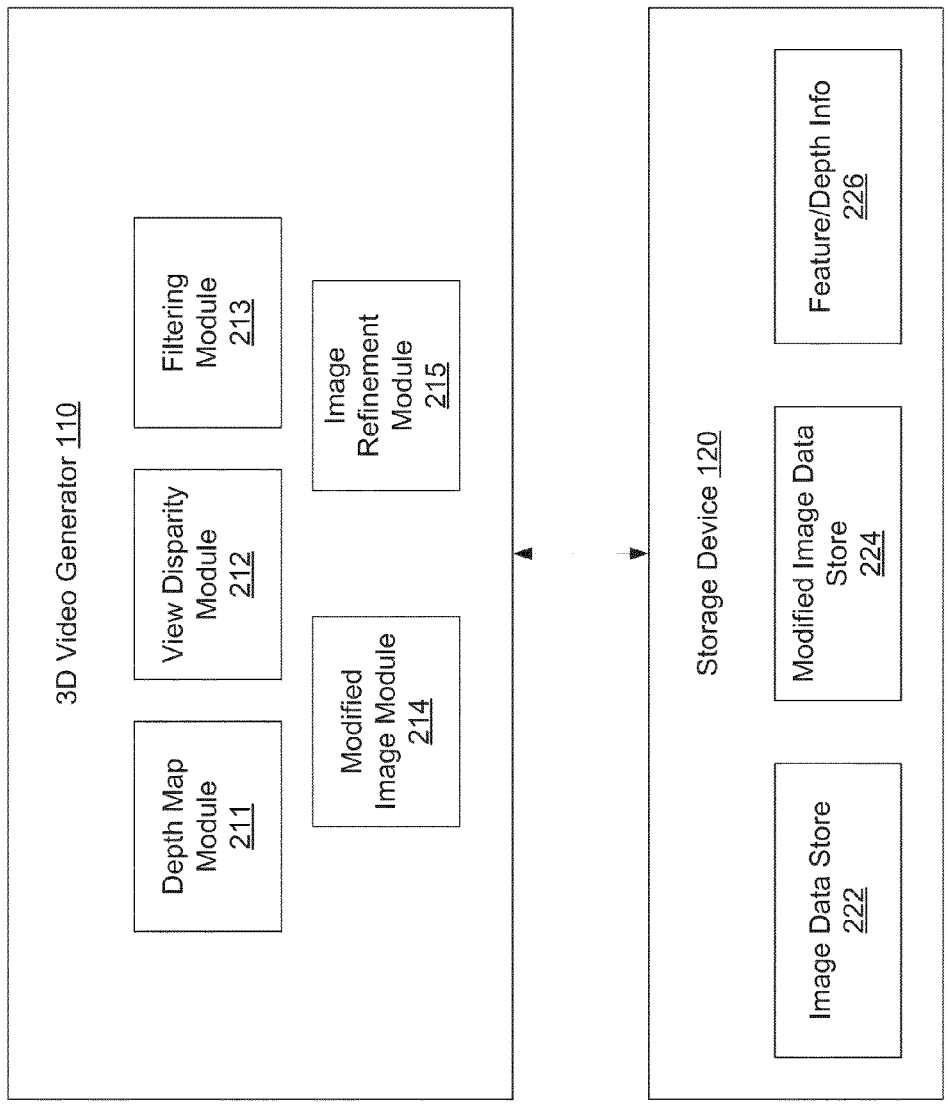
FIG. 2 is a block diagram illustrating a 3D video generator for conversion of a 2D image to 3D video, according to an implementation.

FIG. 2 is a block diagram illustrating a 3D video generator for conversion of a 2D image to 3D video, according to an implementation of the present disclosure. In one implementation, 3D video generator 110 may include depth map module 211, view disparity module 212, filtering module 213, modified image module 214, and image refinement module 215. This arrangement of modules may be a logical separation, and in other implementations, these modules or other components can be combined together or separated in further components, according to a particular implementation. In one implementation, storage device 120 may include image data store 222, modified image data store 224, and feature/depth information 226. In one implementation, 3D video generator 110 maintains image data store 222, modified image data store 224, and feature/depth information 226. 3D video generator 110 can receive a two-dimensional input image (e.g., from a user or a computer application program) that is to be converted to a three-dimensional output video. Using input images in data store 222, modified images in data store 224, and feature/depth information in 226, the various modules of 3D video generator 110 can automatically generate the three-dimensional output video, as will be described below.

In one implementation, depth map module 211, view disparity module 212, filtering module 213, modified image module 214, and image refinement module 216 are used to generate 3D video from the input images in image data store 222 or the modified images in data store 224. Image data store 222 may include, for example, various 2D images that can serve as the input image. Modified image data store 224 may include various modified images (e.g., with pixel shift values applied based on the depth values and view disparity) based on the input images. Feature/depth information 226 may include information to assist in creating a depth map for the 2D input images. For example, feature/depth information 226 may include a mapping between color values and depth values. In one implementation, feature/depth information 226 may include a lookup table or other data structure storing this information. In another implementation, feature/depth information 226 includes a feature-to-depth mapping function, which can receive a color value for a pixel as an input and provide a depth value as an output.

Depth map module 211 may determine a depth value for at least a portion of the pixels in the 2D input image. In one implementation, depth map module 211 extracts the Cr value for a particular pixel from a Y-Cb-Cr version of the input image and consults a look-up table or other data structure stored in feature/depth information 226 to determine a depth value for the pixel based on the Cr value. The depth values in the data structure may be based on the assumption that pixels with the same or similar Cr values will likely have the same or similar depth values. In other implementations, the depth map module 211 may extract and use the Cb value, or a different color scheme altogether to determine the proper depth values. In other implementations, the depth value may be calculated using an algorithm stored in feature/depth information 226. For example, the algorithm may receive a color value, or other feature value associated with a pixel, as an input and the output may be a depth value. The algorithm may be based for example on a sampling of the depth values for known 3D images.

Figure 6:
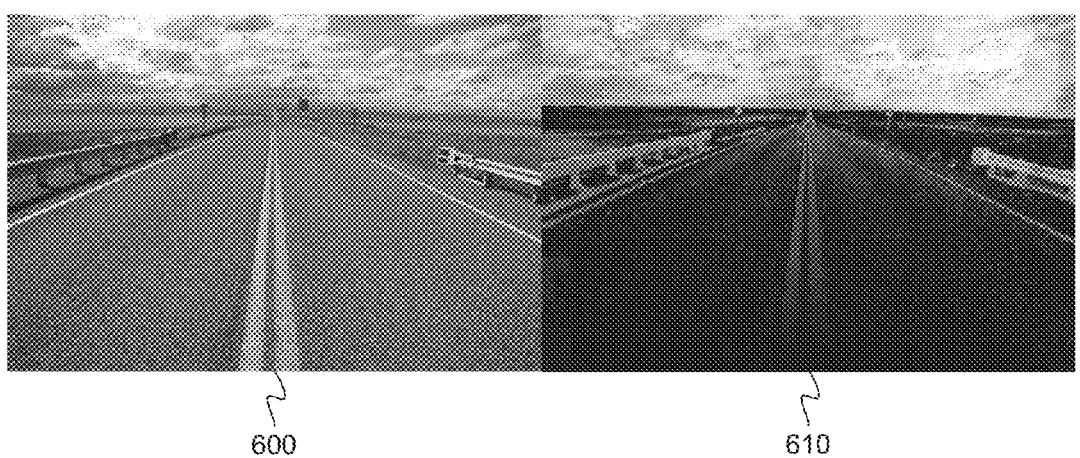
FIG. 6 is a diagram illustrating a depth map computed according to an implementation.

In one implementation, depth map module 211 determines a depth value for every pixel in the 2D input image from data store 222. In another implementation, depth map module 211 determines a depth value for a subset of the pixels in the 2D input image. Depth map module 211 may store these depth values, for example, in storage device 120. The depth values may be combined based on pixel location, to generate a depth map. The depth map relates the distances of objects in the image from a viewpoint. An example of a resulting depth map 610 is shown in FIG. 6.

View disparity module 212 may determine a disparity for each image in image data store 222. View disparity is the distance between viewpoints when looking at the same subject. For instance, taking human vision as an example, view disparity is the distance between the left and right eye. In another example, if two cameras are pointing at the same subject, the distance between the lenses of the two cameras is the view disparity. The view disparity module 212 may determine the view disparity by selecting a pre-determined view disparity value from a list stored in feature/depth information 226. In another implementation, view disparity module 212 may receive a view disparity value from a user at the time of conversion. Another option is that the view disparity may be calculated based on a sequence of images or by some other means. The view disparity values may be in centimeters, inches, or any other format of measurement.

Filtering module 213 optionally applies one or more filters to the depth map generated by depth map module 211 to improve the quality of the depth map. In one implementation, filtering module 213 may receive the depth map as an input and filter the depth map in order to achieve better results when the depth map is used by modified image module 214 to create a modified image. The filtering module 213 made apply any number of smoothing and/or sharpening filters to the depth map. In one implementation, filtering module 213 uses a median filter to smooth out anomalies in the depth map and a bilateral filter is applied to sharpen the edges of the objects in the depth map. In other implementations, filtering module 213 uses other filters to improve the quality of the depth map. For example, a mean filter may be used to smooth or a high pass filter may be used to sharpen.

Upon completion of filtering, the modified image module 214 may apply the view disparity value determined by the view disparity module 212 and the depth values from the filtered depth map to a view rendering algorithm that determines how much to shift each pixel in the input image. This algorithm may be based, for example, on the MPEG N8038 algorithm, or any other algorithm that receives a view disparity and depth values as inputs and outputs a pixel shift value. In one implementation, the view disparity creates a pixel shift in only one direction (i.e. left or right from the input image). In another implementation, the view disparity could be changed in both directions, resulting in some modified images being shifted to the left, and some to the right. In another implementation, the view disparity could be shifted in the vertical direction instead of or in addition to a horizontal shift. The resulting pixel shift may be applied to the input image to generate the modified image. The modified image may be stored in the modified image date store 224. In one implementation, modified image module calculates, using the view rendering algorithm, a pixel shift value for each pixel, or at least a subset of the pixels, in the input image. The pixel shift value may be based, for example, on the depth value of the associated pixel (e.g., which is obtained from depth map module 211) and on the view disparity value (e.g., which is obtained from view disparity module 212). In general, the calculated pixel shift value is proportional to the view disparity value, such that as the view disparity value increases, so does the pixel shift value. The calculated pixel shift value may be inversely proportional to the depth value, such that a pixel with a lower depth value (i.e., indicating that the object represented by the pixel is closer to the viewpoint of the image) has a larger pixel shift value. In other implementations, the view rendering algorithm may take into account different and/or additional information besides view disparity and depth values.

The above process may be repeated to generate additional frames of the 3D video. In one implementation, the modified image module 214 generates a sequence of modified images by using the same input image, and applying a different incremental view disparity to the depth map generated by the depth map module 211 for the input image. With an incremental view disparity value being applied to the depth map, the modified image module 214 may generate multiple modified images based on the same input image. Thus, the view disparity value may increase (in either the positive or negative direction) for each successive modified image (e.g., frame). In another implementation, the modified image module 214 may generate a sequence of modified images serially by using the previous modified image as the new input image. In this implementation, the view disparity may remain constant since a new shift will be applied to a previously shifted modified image, resulting in a sequence of modified images comprising a 3D video.

The image refinement module 215 takes the modified image generated by the modified image module 214 as an input and replaces any pixels from the modified image that are to be hidden due to the change in view disparity and fills in any voids in the modified image that were created due to the pixel shift. In one implementation, the pixel replacement or removal may be referred to as "toeing in" and the filling of voids may be referred to as "inpainting." For example, if the input image shows a single tree in front of a backdrop of mountains, the modified image may show the same tree and the same mountains, but from a different view point. Areas of the mountains that were hidden behind the tree before may become visible, and areas that were visible before may now be hidden behind the tree. The image refinement module 215 may account for these types of occurrences by generating new pixels and replacing pixels in the modified image. Areas where the mountain is now visible may be filled in with mountain-colored pixels and areas were the mountain should now be hidden behind the tree may be replaced by pixels similar in color to the tree.

Figure 3:
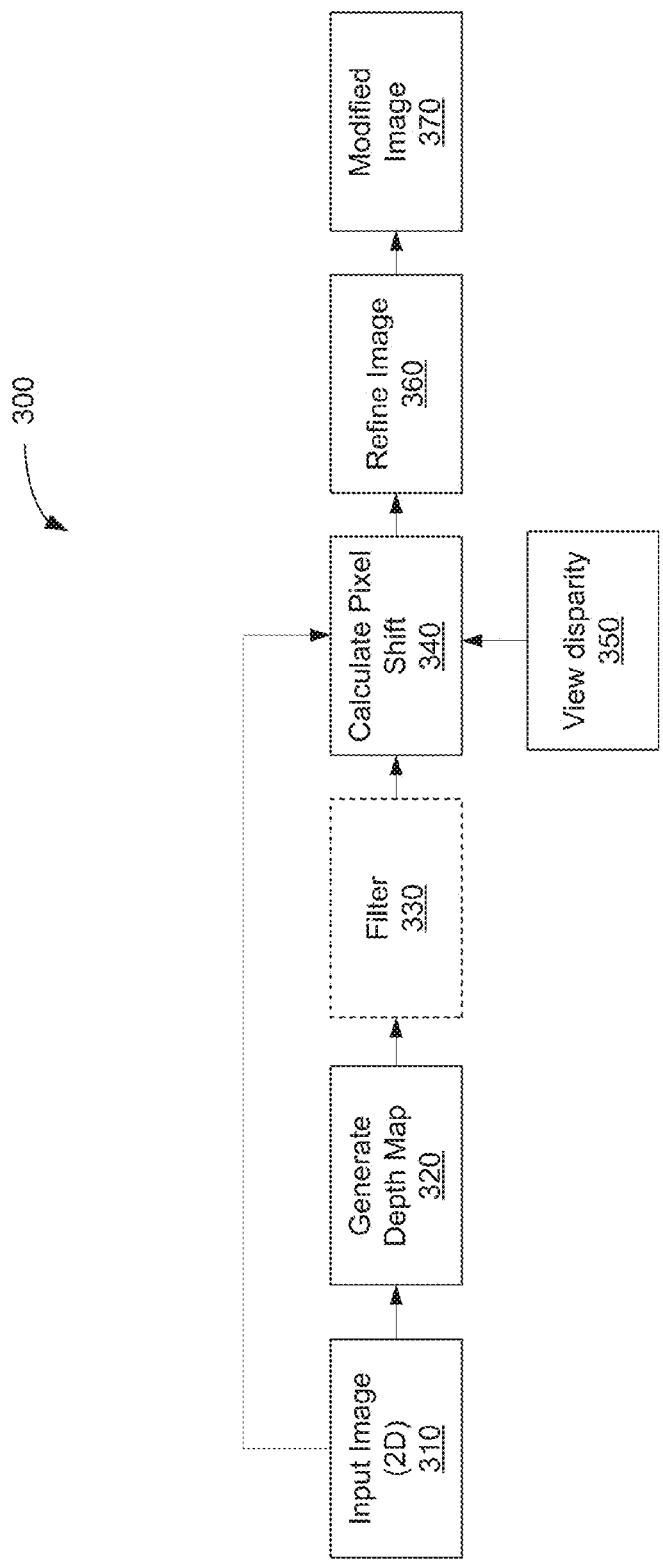
FIG. 3 is a block diagram illustrating an image conversion processing flow, according to an implementation.

FIG. 3 is a block diagram illustrating a 3D video generator processing flow, according to an implementation of the present disclosure. The various modules and components may be described in regards to their roles in generating a 3D video from a 2D image. In one implementation, the processing flow 300 begins with receiving a two-dimensional input image at block 310. At block 320, the input image is used to create a depth map. This may be done by identifying the colors of individual pixels and determining their associated depth values based on those colors. These depth values may be combined into a depth map that is a representation of the depth values of the individual pixels in the input image. At block 330, the resulting depth map may optionally be filtered to reduce any anomalies in the depth values. A smoothing or a sharpening filter may be used to refine the depth map so that more accurate pixel shift values may be generated. At block 340, a pixel shift is calculated according to a view disparity 350 and the filtered depth map from block 330. The view disparity and depth map may be inputs to a function that generates a pixel shift value for a plurality of pixels in the input image. At block 360, the modified image generated at block 340 is refined by replacing pixels in the image that may no longer be visible due to the change in view disparity, and filling any voids where pixels may now be visible. At block 370, the final modified image is created.

Figure 4:
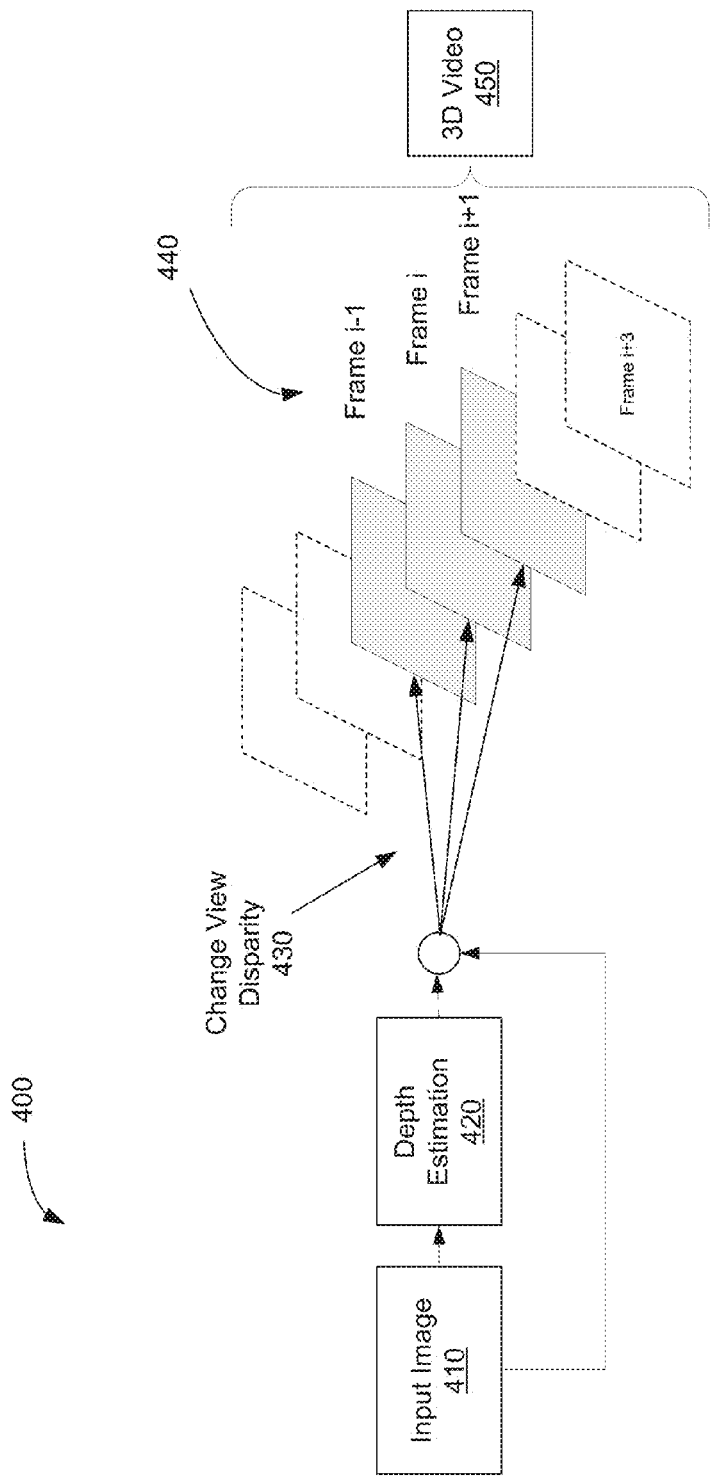
FIG. 4 is a block diagram illustrating a parallel method of creating multiple frames in the resulting 3D video, according to an implementation.

FIG. 4 is a diagram illustrating a parallel method of generating multiple frames in a 3D video, according to an implementation of the present disclosure. In this implementation 400, a depth map 420 is generated for the input image 410 by assigning depth values to the individual pixels in the input image. The resulting depth map and a view disparity may be used to generate a modified image based on a pixel shift in the input image 410. To generate multiple frames that make up the output 3D video, a view disparity 430 is set and a modified image is generated based on the input image. The view disparity value may be changed and a new modified image may be created. The view disparity value may be changed as many times as necessary to generate additional modified images based on the single input image. In one implementation, the change in view disparity 430 is different for each frame (e.g., frame i−1, frame i, frame i+1), as each modified frame is generated based on the original input image 410. The resulting set of modified images 440 can be used to form the output 3D video 450. In another implementation, a sequential method may be used to create the modified images. In another implementation, a combination of a series method and a parallel method may be used.

Figure 5:
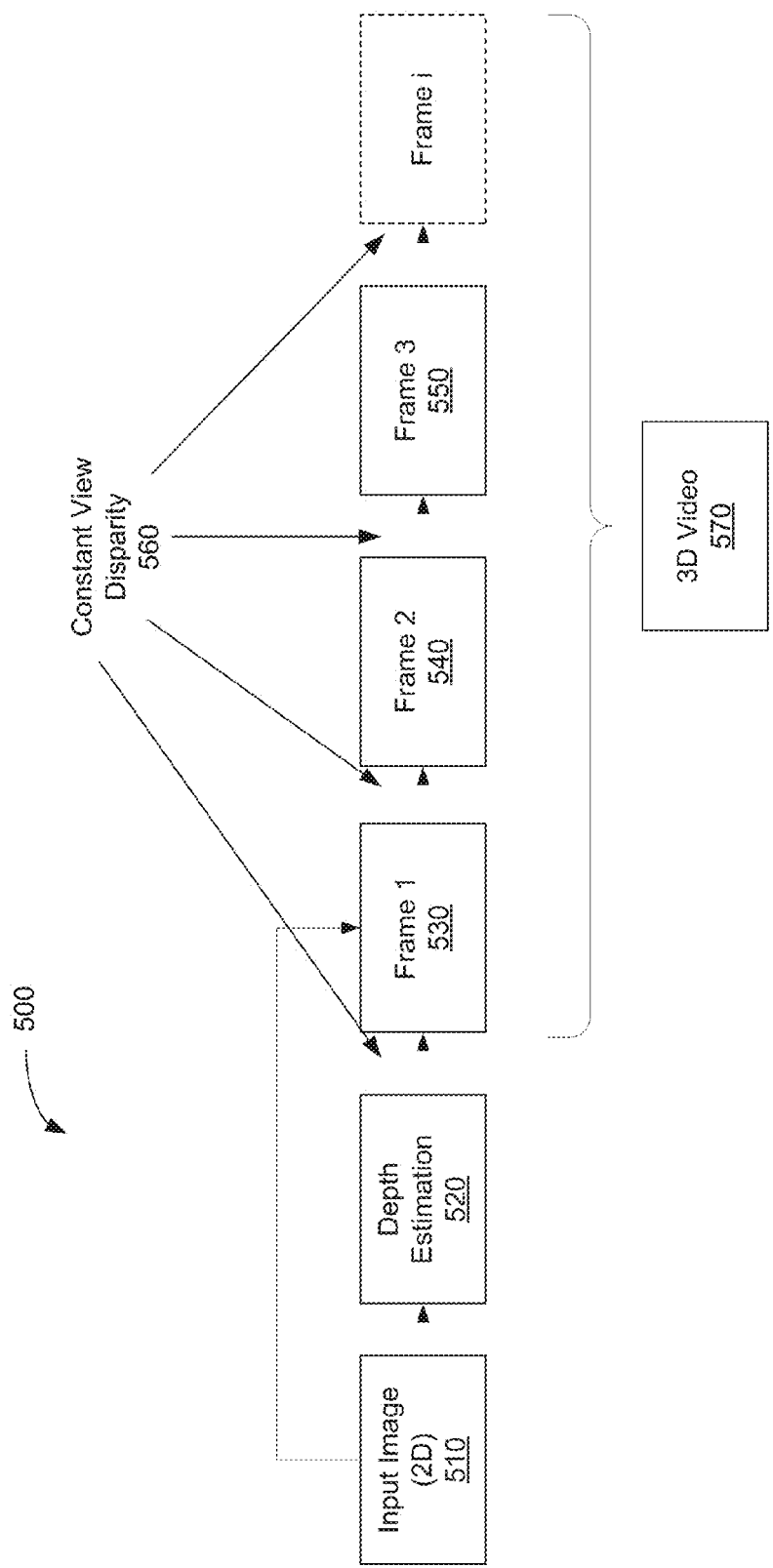
FIG. 5 is a block diagram illustrating a sequential method of creating multiple frames in the resulting 3D video, according to an implementation.

FIG. 5 is a diagram illustrating a sequential method of creating multiple frames in a 3D video, according to an implementation of the present disclosure. In this implementation 500, just like in implementation 400, a depth map 520 is generated for the input image 510. The view disparity and depth map may be inputs to a function that generates a pixel shift for a plurality of pixels in the input image. A modified image 530 may be generated based on the shifted input image. To generate multiple frames that will make up the output 3D video, the view disparity value 560 may remain constant and be applied to each previously modified image instead of the input image. For example, modified image 530 may be taken as the new input image, and a view disparity 560 may be applied to that image which results in modified image 540. Then, the same view disparity value 560 is applied to image 540 to generate modified image 550. In this way, a series of frames can be generated sequentially, without referring back to the input image for each generation of a new modified image. As stated above, in another implementation the parallel method 400 or a combination of a series method 500 and a parallel method 400 may be used to generate multiple frames in a 3D video.

FIG. 6 is a diagram illustrating a depth map computed according to implementations of the present disclosure. Depth map generation module 211 may compute a depth map for the input image based on color values and associated depth values. In the depth map 610 of FIG. 6, the shading is proportional to the distance of the surfaces of scene objects from the viewpoint in the source image 600. In this implementation, darker colors indicate a depth that is closer to the viewpoint, while lighter colors indicate a depth that is further away. In other implementations, the shading may be reversed.

Figure 7:
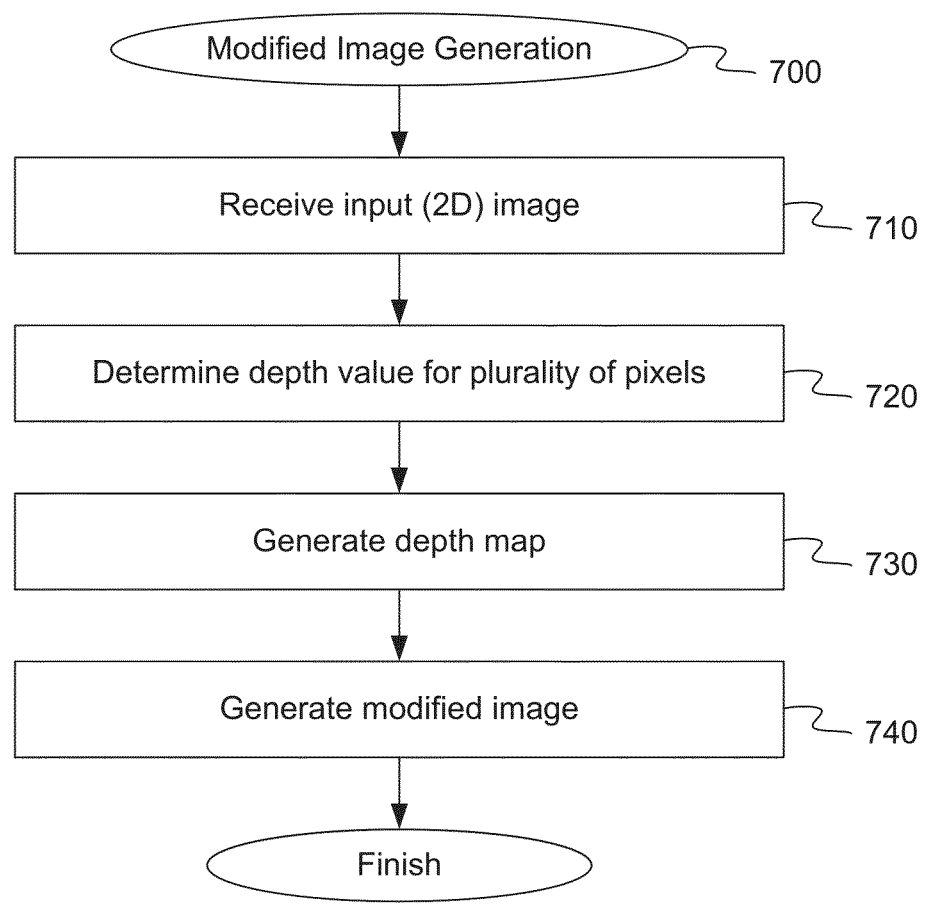
FIG. 7 is a flow diagram illustrating a method for generating a modified image, according to an implementation.

FIG. 7 is a flow diagram illustrating a method for generating a modified image according to an implementation of the present disclosure. The method 700 may be performed by processing logic that comprises hardware (e.g., circuitry, dedicated logic, programmable logic, microcode, etc.), software (e.g., instructions run on a processing device to perform hardware simulation), or a combination thereof. The method 700 can generate 3D video from a single 2D image. In one implementation, method 700 may be performed by 3D video generator 110 as shown in FIGS. 1 and 2.

Referring to FIG. 7, at block 710, method 700 receives a 2D input image. In one implementation the input image may be stored in the image data store 222. In another implementation the input image may be stored in the modified image data store 224. Additionally, the input image may be received from a user (e.g., through a user interface provided by 3D video generator 110), from another computer application program (e.g., through an application interface, such as an API), or from any other source.

At block 720, method 700 determines a depth value for each of a plurality of pixels in the input image. In one implementation, depth map module 211 generates the depth values by determining color values for each of the plurality of pixels in the input image. Color values may be based on the Y-Cb-Cr color scheme or any other color scheme such as RGB or CMYK. Depth values associated with colors values and color schemes may be found in a table or determined by using an algorithm. The table or the algorithm may be stored in feature/depth information 226.

At block 730, method 700 combines the depth values determined by depth module 211 at block 720 into a depth map. In one implementation the depth map may be a visual representation of the depth values in an image, as shown in FIG. 6. In another implementation the depth map may be a list of depth values associated with pixel locations for a particular image.

At block 740, method 700 generates a modified image in the modified image module 214 based on the input image, the depth map from the depth map module 211, and a view disparity value from the view disparity module 212. In one implementation, modified image module 214 applies the depth values from the depth map, along with the view disparity value, as inputs to a view rendering algorithm. The view rendering algorithm calculates a pixel shift value for each pixel (or at least a subset of the pixels) in the input image. Modified image module 214 may apply the pixel shift values to the input image to generate the modified image.

Figure 8:
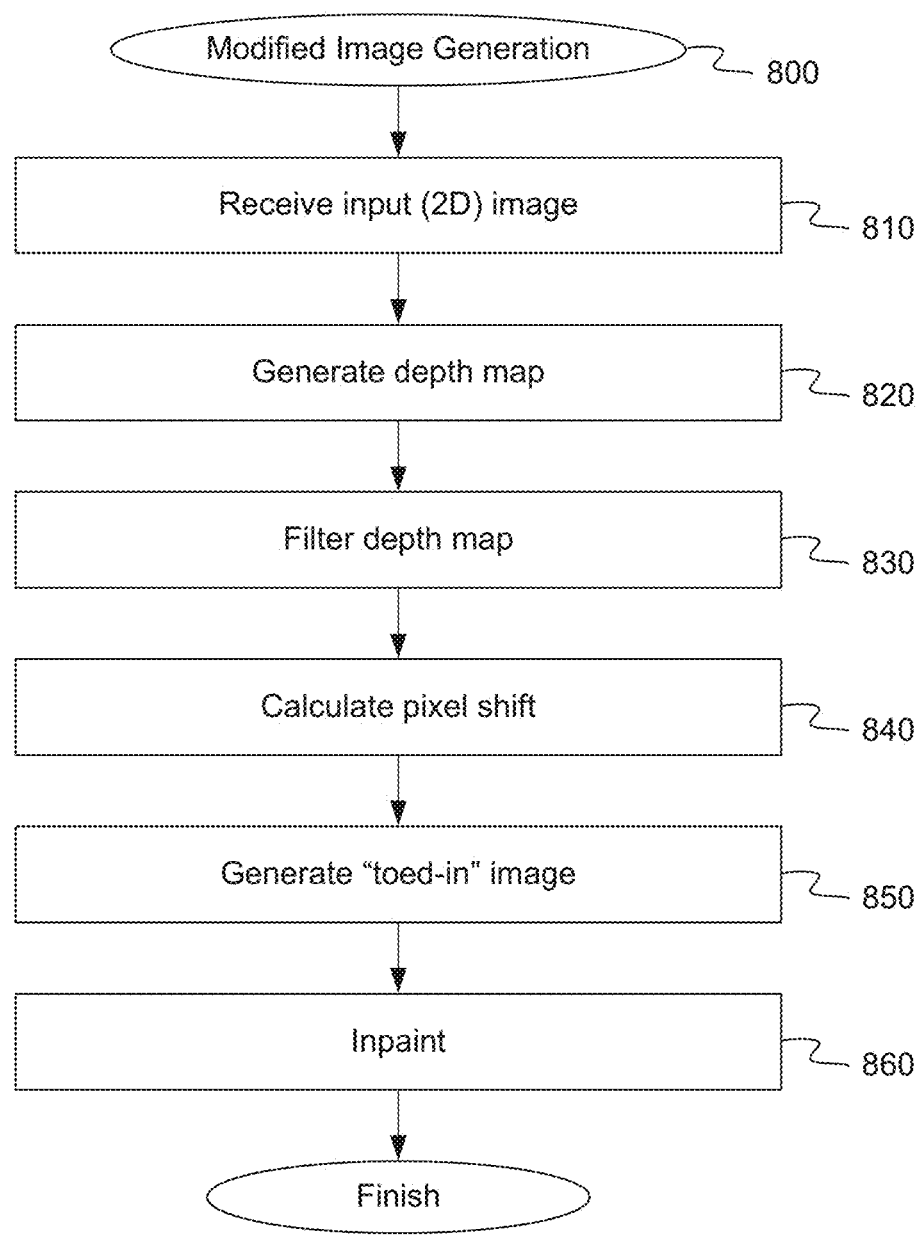
FIG. 8 is a flow diagram illustrating a more detailed method for generating a modified image, according to an implementation.

FIG. 8 is a flow diagram illustrating a more detailed method for generating a modified image according to an implementation of the present disclosure. The method 800 may be performed by processing logic that comprises hardware (e.g., circuitry, dedicated logic, programmable logic, microcode, etc.), software (e.g., instructions run on a processing device to perform hardware simulation), or a combination thereof. The method 800 may generate a modified image used to generate a 3D video out of a single 2D image. In one implementation, method 800 may be performed by 3D video generator 110 as shown in FIGS. 1 and 2.

Referring to FIG. 8, at block 810, method 800 receives a 2D input image. In one implementation the input image may be stored in the image data store 222. In another implementation the input image may be stored in the modified image data store 224. Additionally, the input image may be received from a user (e.g., through a user interface provided by 3D video generator 110), from another computer application program (e.g., through an application interface, such as an API), or from some other source.

At block 820, method 800 determines a depth value for each of a plurality of pixels in an input image and combines the depth values into a depth map based on the input image.

At block 830, method 800 optionally filters the depth map generated in the depth map module 211. Filtering may be performed by the filtering module 213 to remove the anomalies introduced by the determination of depth values from a particular color scheme. Noise anomalies in the individual pixel colors in the input image may cause incorrect depth values to be generated by the depth map module 211. By filtering the depth map to smooth out the anomalies or sharpen the edges of the subjects in an image, the resulting depth map may be a more accurate representation of the actual depth values in the input image. In one implementation, a median filter may be used to smooth the depth map or a bilateral filter may be used to sharpen the depth map. In another implementation, a different smoothing or sharpening filter may be used. In another implementation, different types of filters altogether may be used or no filters at all.

At block 840, method 800 generates pixel shift values according to the depth map and a view disparity and applies the pixel shift values to the input image to generate a modified image. In one implementation, modified image module 214 calculates a pixel shift based on an algorithm such as MPEG N8038 and a user defined, default, or predetermined view disparity. In another implementation, a different algorithm may be used and a view disparity may be calculated by a view disparity algorithm. In another implementation, the view disparity may be predefined in storage device 120 or elsewhere.

At block 850, method 800 refines the modified image by "toeing-in." An algorithm may be used to replace pixels in the modified image that may now be hidden due to the change in view disparity and resulting pixel shift. In one implementation, the pixels which are hidden may be replaced with the pixels representing an object that is now in front of the hidden pixels. At block 860, method 800 further refines the modified image by "inpainting," or using an algorithm to fill in voids in the modified image where pixels need to be generated due to the change in view disparity and resulting pixel shift. In one implementation, the voids may be filled in the modified image by replacing the blank pixels with the color of a nearest neighboring pixel. In another implementation an average of all of the nearest neighbors' colors may be calculated and used to fill voids in the modified image.

Figure 9:
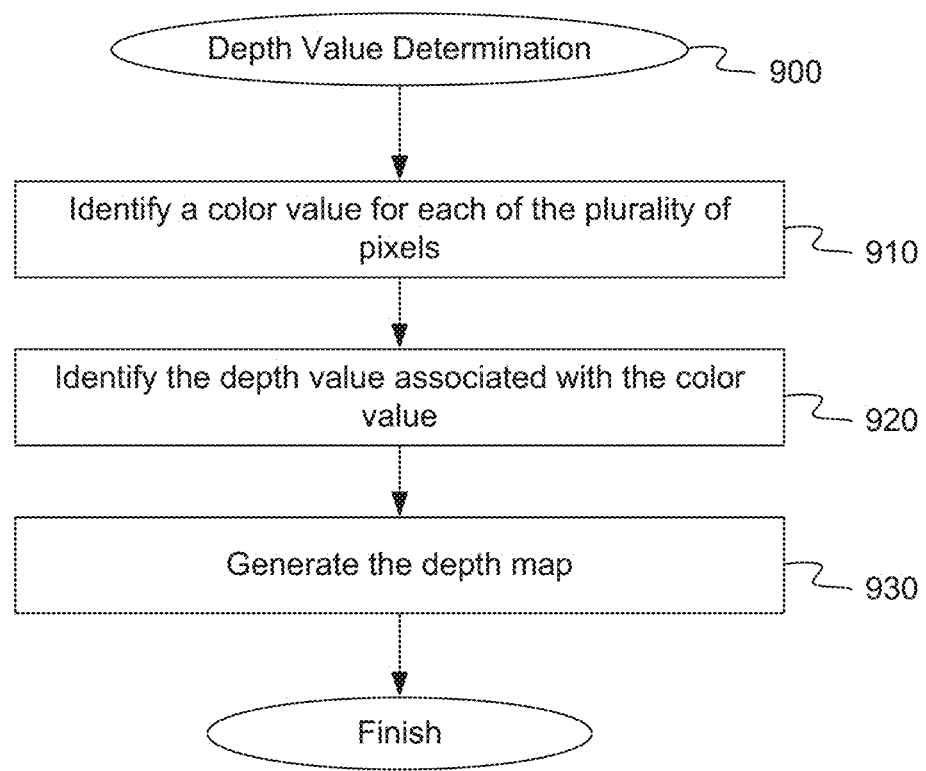
FIG. 9 is a flow diagram illustrating a method for depth value determination, according to an implementation.

FIG. 9 is a flow diagram illustrating a method for depth value determination according to an implementation of the present disclosure. The method 900 may be performed by processing logic that comprises hardware (e.g., circuitry, dedicated logic, programmable logic, microcode, etc.), software (e.g., instructions run on a processing device to perform hardware simulation), or a combination thereof. The method 900 can determine depth values for pixels in a 2D image for use in generating a modified image used to generate a 3D video out of the single 2D image. In one implementation, method 900 may be performed by 3D video generator 110 as shown in FIGS. 1 and 2.

Referring to FIG. 9, at block 910, method 900 identifies a color value for each of the plurality of pixels in the input image. As stated above, the color value can be based on any number of color schemes. In one implementation, it is the Cr color value from the Y-Cb-Cr color scheme. In block 920, the color value is used to help identify a depth value that is associated with the color value. In one implementation, the depth value can be found in a table of color values and their corresponding depth values. In another implementation the depth value can be calculated by an algorithm.

At block 930, method 800 generates a depth map corresponding with the depth values found in block 920.

Figure 10:
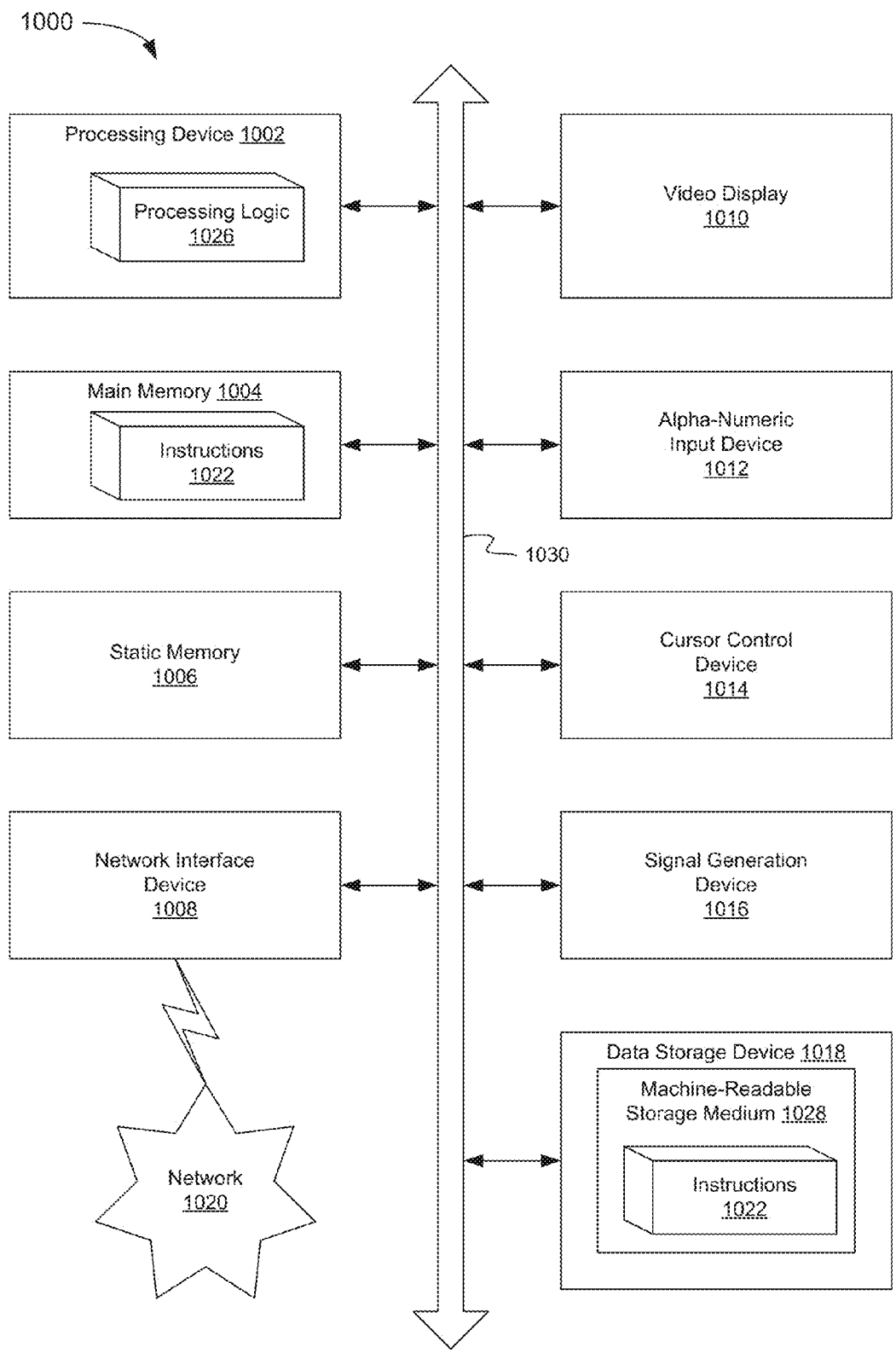
FIG. 10 is a block diagram illustrating one implementation of a computer system, according to an implementation.

FIG. 10 illustrates a diagrammatic representation of a machine in the exemplary form of a computer system 1000 within which a set of instructions, for causing the machine to perform any one or more of the methodologies discussed herein, may be executed. In alternative implementations, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one implementation, computer system 1000 may be representative of a server, such as server 102, running 3D video generator 110.

The exemplary computer system 1000 includes a processing device 1002, a main memory 904 (e.g., read-only memory (ROM), flash memory, dynamic random access memory (DRAM) (such as synchronous DRAM (SDRAM) or Rambus DRAM (RDRAM), etc.), a static memory 1006 (e.g., flash memory, static random access memory (SRAM), etc.), and a data storage device 1018, which communicate with each other via a bus 1030. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 1002 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 1002 is configured to execute processing logic 1026 for performing the operations and steps discussed herein.

The computer system 1000 may further include a network interface device 1008. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1016 (e.g., a speaker).

The data storage device 1018 may include a machine-readable storage medium 1028, on which is stored one or more set of instructions 1022 (e.g., software) embodying any one or more of the methodologies of functions described herein. The instructions 1022 may also reside, completely or at least partially, within the main memory 1004 and/or within the processing device 1002 during execution thereof by the computer system 1000; the main memory 1004 and the processing device 1002 also constituting machine-readable storage media. The instructions 1022 may further be transmitted or received over a network 1020 via the network interface device 1008.

The machine-readable storage medium 1028 may also be used to store instructions to perform a method for generating 3D video from a single 2D image, as described herein. While the machine-readable storage medium 1028 is shown in an exemplary implementation to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

Although the operations of the methods herein are shown and described in a particular order, the order of the operations of each method may be altered so that certain operations may be performed in an inverse order or so that certain operation may be performed, at least in part, concurrently with other operations. In another implementation, instructions or sub-operations of distinct operations may be in an intermittent and/or alternating manner.

What is claimed is:

1. A method comprising:
   receiving a two-dimensional input image to be used in a creation of a three-dimensional video;
   determining, by a processing device, a depth value for ones of a plurality of pixels in the input image;
   generating a depth map based on the depth values for ones of the plurality of pixels;
   calculating pixel shift values for the plurality of pixels based on the depth map and a view disparity value;
   generating, based on the input image and the pixel shift values, a modified image corresponding to a particular frame of the three-dimensional video;
   incrementing the view disparity value for a next frame of the three-dimensional video that is after the particular frame; and
   generating an additional modified image corresponding to the next frame of the three-dimensional video based on the same input image used to generate the modified image and the pixel shift values that are varied based on the incremented view disparity value, wherein the modified image in combination with the input image and the additional modified image comprises a sequence of frames in the three-dimensional video.

2. The method of claim 1, wherein determining the depth value for ones of the plurality of pixels in the input image comprises:
   identifying a color value for ones of the plurality of pixels; and
   identifying the depth value associated with the color value.

3. The method of claim 2, wherein identifying the color value for ones of the plurality of pixels is based on the color space Y-Cb-Cr.

4. The method of claim 1, wherein calculating the pixel shift values for the plurality of pixels comprises applying the depth values and the view disparity value to a view rendering algorithm.

5. The method of claim 1, further comprising:
   filtering the depth map, wherein the filtering comprises applying at least one of a smoothing filter or a sharpening filter.

6. The method of claim 1, wherein generating the modified image comprises:
   removing pixels in the modified image that are hidden as a result of the view disparity value; and
   inpainting a void in the modified image created as a result of the view disparity value.

7. The method of claim 1, wherein the view disparity value corresponds to a distance between viewpoints with respect to a same subject associated with the two-dimensional input image.

8. The method of claim 1, wherein the view disparity value is incremented for each successive frame of the three-dimensional video.

9. A system comprising:
   a memory; and
   a processing device, operatively coupled with the memory, to:
   receive a two-dimensional input image to be used in a creation of a three-dimensional video;
   determine a depth value for ones of a plurality of pixels in the input image;
   generate a depth map based on the depth values for ones of the plurality of pixels;
   calculate pixel shift values for the plurality of pixels based on the depth map and a view disparity value;
   generate, based on the input image and the pixel shift values, a modified image corresponding to a particular frame of the three-dimensional video;
   increment the view disparity value for a next frame of the three-dimensional video that is after the particular frame; and
   generate an additional modified image corresponding to the next frame of the three-dimensional video based on the same input image used to generate the modified image and the pixel shift values that are varied based on the incremented view disparity value, wherein the modified image in combination with the input image and the additional modified image comprises a sequence of frames in the three-dimensional video.

10. The system of claim 9, wherein determining the depth value for ones of the plurality of pixels in the input image comprises:
    identifying a color value for ones of the plurality of pixels; and
    identifying the depth value associated with the color value.

11. The system of claim 10, wherein identifying the color value for ones of the plurality of pixels is based on the color space Y-Cb-Cr.

12. The system of claim 9, wherein calculating the pixel shift values for the plurality of pixels comprises applying the depth values and the view disparity value to a view rendering algorithm.

13. The system of claim 9, further comprising:
filtering the depth map, wherein the filtering comprises applying at least one of a smoothing filter or a sharpening filter.

14. The method of claim 9, wherein generating the modified image comprises:
removing pixels in the modified image that are hidden as a result of the view disparity value; and
inpainting a void in the modified image created as a result of the view disparity value.

15. A non-transitory machine-readable storage medium storing instructions which, when executed, cause a processing device to perform operations comprising:
receiving a two-dimensional input image to be used in a creation of a three-dimensional video;
determining, by the processing device, a depth value for ones of a plurality of pixels in the input image;
generating a depth map based on the depth values for ones of the plurality of pixels;
calculating pixel shift values for the plurality of pixels based on the depth map and a view disparity value; and
generating, based on the input image and the pixel shift values, a modified image corresponding to a particular frame of the three-dimensional video;
incrementing the view disparity value for a next frame of the three-dimensional video that is after the particular frame; and
generating an additional modified image corresponding to the next frame of the three-dimensional video based on the same input image used to generate the modified image and the pixel shift values that are varied based on the incremented view disparity value, wherein the modified image in combination with the input image and the additional modified image comprises a sequence of frames in the three-dimensional video.

16. The non-transitory machine-readable storage medium of claim 15, wherein determining the depth value for ones of the plurality of pixels in the input image comprises:
identifying a color value for ones of the plurality of pixels; and
identifying the depth value associated with the color value.

17. The non-transitory machine-readable storage medium of claim 15, wherein calculating the pixel shift values for the plurality of pixels comprises applying the depth values and the view disparity value to a view rendering algorithm.

18. The non-transitory machine-readable storage medium of claim 15, the operations further comprising:
filtering the depth map, wherein the filtering comprises applying at least one of a smoothing filter or a sharpening filter.

19. The non-transitory machine-readable storage medium of claim 15, wherein generating the modified image comprises:
removing pixels in the modified image that are hidden as a result of the view disparity value; and
inpainting a void in the modified image created as a result of the view disparity value.

* * * * *